(12) United States Patent
Luke et al.

(10) Patent No.: US 7,544,642 B2
(45) Date of Patent: Jun. 9, 2009

(54) ZEOLITE-CONTAINING REMEDIAL COMPOSITIONS

(75) Inventors: Karen Luke, Duncan, OK (US); Russell M. Fitzgerald, Velma, OK (US); Frank Zamora, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 11/488,388

(22) Filed: Jul. 17, 2006

(65) Prior Publication Data

US 2006/0258547 A1 Nov. 16, 2006

Related U.S. Application Data

(60) Division of application No. 10/727,370, filed on Dec. 4, 2003, now Pat. No. 7,140,439, which is a continuation-in-part of application No. 10/686,098, filed on Oct. 15, 2003, now Pat. No. 6,964,302, which is a continuation-in-part of application No. 10/623,443, filed on Jul. 18, 2003, which is a continuation-in-part of application No. 10/315,415, filed on Dec. 10, 2002, now Pat. No. 6,989,057.

(51) Int. Cl.
*E21B 33/13* (2006.01)
*C09K 8/467* (2006.01)

(52) U.S. Cl. ............ 507/269; 507/240; 507/244; 507/247; 507/253; 507/265; 507/271; 507/272; 507/276; 166/292; 166/305.1

(58) Field of Classification Search .............. None
See application file for complete search history.

(56) References Cited

U.S. PATENT DOCUMENTS

| | | |
|---|---|---|
| 1,943,584 A | 1/1934 | Cross |
| 2,094,316 A | 9/1937 | Cross et al. |
| 2,131,338 A | 9/1938 | Vall |
| 2,349,049 A | 5/1944 | Means |
| 2,581,186 A | 1/1952 | Green |
| 2,662,827 A | 12/1953 | Clark |
| 2,727,001 A | 12/1955 | Rowe |
| 2,848,051 A | 8/1958 | Williams |
| 3,047,493 A | 7/1962 | Rosenberg |
| 3,065,170 A | 11/1962 | Dumbauld et al. |
| 3,179,528 A | 4/1965 | Holmgreen et al. |
| 3,293,040 A | 12/1966 | Shaler, Jr. et al. |
| 3,359,225 A | 12/1967 | Weisend |
| 3,374,057 A | 3/1968 | McDaniel et al. |
| 3,406,124 A | 10/1968 | Eastwood et al. |
| 3,640,905 A | 2/1972 | Wilson |
| 3,647,717 A | 3/1972 | Bolton |
| 3,676,330 A | 7/1972 | Plank et al. |
| 3,694,152 A | 9/1972 | Sersale et al. |
| 3,781,225 A | 12/1973 | Schwartz |
| 3,884,302 A | 5/1975 | Messenger |
| 3,887,385 A | 6/1975 | Quist et al. |
| 3,888,998 A | 6/1975 | Sampson et al. |
| 3,963,508 A | 6/1976 | Masaryk |
| 4,031,959 A * | 6/1977 | Henderson .............. 166/307 |
| 4,054,462 A | 10/1977 | Stude |
| 4,141,843 A | 2/1979 | Watson |
| 4,149,960 A * | 4/1979 | Garwood et al. ....... 208/111.15 |
| 4,199,607 A | 4/1980 | Sherman et al. |
| 4,217,229 A | 8/1980 | Watson |
| 4,280,560 A * | 7/1981 | Sydansk ................ 166/305.1 |
| 4,311,607 A | 1/1982 | Kaeser |
| 4,363,736 A | 12/1982 | Block |
| 4,368,134 A | 1/1983 | Kaeser |
| 4,372,876 A | 2/1983 | Kulprathipanja et al. |
| 4,435,216 A | 3/1984 | Diehl et al. |
| 4,444,668 A | 4/1984 | Walker et al. |
| 4,468,334 A | 8/1984 | Cox et al. |
| 4,474,667 A | 10/1984 | Block |
| 4,482,379 A | 11/1984 | Dibrell et al. |
| 4,515,216 A | 5/1985 | Childs et al. |
| 4,515,635 A | 5/1985 | Rao et al. |
| 4,519,844 A * | 5/1985 | Chaux et al. ........... 106/205.2 |
| 4,530,402 A | 7/1985 | Smith et al. |
| 4,536,297 A | 8/1985 | Loftin et al. |
| 4,548,734 A * | 10/1985 | Chaux et al. ................ 516/53 |
| 4,552,591 A | 11/1985 | Millar |
| 4,555,269 A | 11/1985 | Rao et al. |

(Continued)

FOREIGN PATENT DOCUMENTS

CA 2153372 1/1996

(Continued)

OTHER PUBLICATIONS

Derwent Abstract of WO 2000/42147 entitled "Detergent Composition useful in cleaning fabric, dishware and or hard surfaces . . . "; Bettiol et al. as inventors, Jul. 20, 2000.*

(Continued)

*Primary Examiner*—James Seidleck
*Assistant Examiner*—John J Figueroa
(74) *Attorney, Agent, or Firm*—Craig W. Roddy; Haynes & Boone, LLP

(57) ABSTRACT

Methods and compositions for wellbore treating fluids that include zeolite and at least one carrier fluid.

20 Claims, No Drawings

U.S. PATENT DOCUMENTS

| | | | |
|---|---|---|---|
| 4,557,763 A | 12/1985 | George et al. | |
| 4,632,186 A | 12/1986 | Boncan et al. | |
| 4,650,593 A | 3/1987 | Slingerland | |
| 4,652,391 A * | 3/1987 | Balk | 510/356 |
| 4,676,317 A | 6/1987 | Fry et al. | |
| 4,703,801 A | 11/1987 | Fry et al. | |
| 4,717,488 A | 1/1988 | Sehuelt et al. | |
| 4,721,633 A * | 1/1988 | Baldassin | 427/212 |
| 4,772,307 A | 9/1988 | Kiss et al. | |
| 4,784,693 A | 11/1988 | Kirkland et al. | |
| 4,802,921 A | 2/1989 | Motoki | |
| 4,818,288 A | 4/1989 | Aignesberger et al. | |
| 4,818,518 A | 4/1989 | Gioffre et al. | |
| 4,888,120 A | 12/1989 | Mueller et al. | |
| 4,943,544 A | 7/1990 | McGarry et al. | 501/124 |
| 4,986,989 A * | 1/1991 | Sirosita et al. | 424/635 |
| 5,121,795 A | 6/1992 | Ewert et al. | |
| 5,123,487 A | 6/1992 | Harris et al. | |
| 5,125,455 A | 6/1992 | Harris et al. | |
| 5,127,473 A | 7/1992 | Harris et al. | |
| 5,151,131 A | 9/1992 | Burkhalter et al. | |
| 5,238,064 A | 8/1993 | Dahl et al. | |
| 5,252,554 A | 10/1993 | Mueller et al. | |
| 5,301,752 A | 4/1994 | Cowan et al. | |
| 5,307,876 A | 5/1994 | Cowan et al. | |
| 5,314,022 A | 5/1994 | Cowan et al. | |
| 5,314,852 A * | 5/1994 | Klatte | 502/60 |
| 5,340,388 A | 8/1994 | Breton et al. | |
| 5,340,860 A | 8/1994 | Brake et al. | |
| 5,346,012 A | 9/1994 | Heathman et al. | |
| 5,383,967 A | 1/1995 | Chase | |
| 5,435,846 A | 7/1995 | Tatematsu et al. | |
| 5,464,060 A | 11/1995 | Hale et al. | |
| 5,494,513 A | 2/1996 | Fu et al. | |
| 5,501,276 A | 3/1996 | Weaver et al. | |
| 5,527,387 A | 6/1996 | Andersen et al. | 106/693 |
| 5,529,624 A | 6/1996 | Riegler | |
| 5,588,489 A | 12/1996 | Chatterji et al. | |
| 5,626,665 A | 5/1997 | Barger et al. | |
| 5,658,624 A | 8/1997 | Anderson et al. | 428/34.7 |
| 5,680,900 A | 10/1997 | Nguyen et al. | |
| 5,711,383 A | 1/1998 | Terry et al. | |
| 5,716,910 A | 2/1998 | Totten et al. | |
| 5,759,964 A | 6/1998 | Shuchart et al. | |
| 5,776,850 A * | 7/1998 | Klatte et al. | 502/64 |
| 5,788,762 A | 8/1998 | Barger et al. | |
| 5,789,352 A | 8/1998 | Carpenter et al. | |
| 5,807,810 A | 9/1998 | Blezard et al. | |
| 5,821,233 A * | 10/1998 | Van Rijn et al. | 514/31 |
| 5,851,960 A | 12/1998 | Totten et al. | |
| 5,866,517 A | 2/1999 | Carpenter et al. | |
| 5,880,048 A * | 3/1999 | Sato et al. | 501/125 |
| 5,883,070 A | 3/1999 | Urfer et al. | |
| 5,902,564 A * | 5/1999 | Lujano et al. | 423/702 |
| 5,913,364 A | 6/1999 | Sweatman | |
| 5,964,692 A | 10/1999 | Blezard et al. | |
| 5,980,446 A | 11/1999 | Loomis et al. | |
| 5,990,052 A | 11/1999 | Harris | |
| 5,997,625 A | 12/1999 | Londo et al. | |
| 6,060,434 A | 5/2000 | Sweatman et al. | |
| 6,063,738 A | 5/2000 | Chatterji et al. | |
| 6,070,664 A | 6/2000 | Dalrymple et al. | |
| 6,138,759 A | 10/2000 | Chatterji et al. | |
| 6,145,591 A | 11/2000 | Boncan et al. | |
| 6,149,724 A | 11/2000 | Ulibarri et al. | |
| 6,153,562 A | 11/2000 | Villar et al. | |
| 6,167,967 B1 | 1/2001 | Sweatman et al. | |
| 6,170,575 B1 | 1/2001 | Reddy et al. | |
| 6,171,386 B1 | 1/2001 | Sabins | |
| 6,176,315 B1 | 1/2001 | Reddy et al. | |
| 6,182,758 B1 | 2/2001 | Vijn | |
| 6,209,646 B1 | 4/2001 | Reddy et al. | |
| 6,210,476 B1 | 4/2001 | Chatterji et al. | |
| 6,213,213 B1 | 4/2001 | van Batenburg et al. | |
| 6,230,804 B1 | 5/2001 | Mueller et al. | |
| 6,234,251 B1 | 5/2001 | Chatterji et al. | |
| 6,235,809 B1 | 5/2001 | DiLullo Arias et al. | |
| 6,245,142 B1 | 6/2001 | Reddy et al. | |
| 6,258,757 B1 | 7/2001 | Sweatman et al. | |
| 6,283,213 B1 | 9/2001 | Chan | |
| 6,312,515 B1 | 11/2001 | Barlet-Gouedard et al. | |
| 6,315,042 B1 | 11/2001 | Griffith et al. | |
| 6,372,694 B1 | 4/2002 | Osinga et al. | |
| 6,379,456 B1 | 4/2002 | Heathman et al. | |
| 6,387,873 B1 | 5/2002 | Carter et al. | |
| 6,390,197 B1 | 5/2002 | Maroy | |
| 6,405,801 B1 | 6/2002 | Vijn et al. | |
| 6,409,819 B1 | 6/2002 | Ko | |
| 6,457,524 B1 | 10/2002 | Roddy | |
| 6,475,275 B1 | 11/2002 | Nebesnak et al. | |
| 6,478,869 B2 | 11/2002 | Reddy et al. | |
| 6,488,091 B1 | 12/2002 | Weaver et al. | |
| 6,494,951 B1 | 12/2002 | Reddy et al. | |
| 6,508,305 B1 | 1/2003 | Brannon et al. | |
| 6,508,306 B1 | 1/2003 | Reddy et al. | |
| 6,524,384 B2 | 2/2003 | Griffith et al. | |
| 6,555,505 B1 | 4/2003 | King et al. | |
| 6,565,647 B1 | 5/2003 | Day et al. | |
| 6,566,310 B2 | 5/2003 | Chan | |
| 6,572,698 B1 | 6/2003 | Ko | |
| 6,593,402 B2 | 7/2003 | Chatterji et al. | |
| 6,607,035 B1 | 8/2003 | Reddy et al. | |
| 6,610,139 B2 | 8/2003 | Reddy et al. | |
| 6,616,753 B2 | 9/2003 | Reddy et al. | |
| 6,626,243 B1 | 9/2003 | Boncan | |
| 6,626,991 B1 | 9/2003 | Drochon et al. | |
| 6,627,084 B2 * | 9/2003 | Murphy et al. | 210/691 |
| 6,630,021 B2 | 10/2003 | Reddy et al. | |
| 6,645,289 B2 * | 11/2003 | Sobolev et al. | 106/705 |
| 6,656,265 B1 | 12/2003 | Garnier et al. | |
| 6,656,266 B1 | 12/2003 | Barlet-Gouedard et al. | |
| 6,660,080 B2 | 12/2003 | Reddy et al. | |
| 6,702,044 B2 | 3/2004 | Reddy et al. | |
| 6,711,213 B2 | 3/2004 | He et al. | |
| 6,713,553 B2 | 3/2004 | Gonnon et al. | |
| 6,719,055 B2 | 4/2004 | Mese et al. | |
| 6,722,434 B2 | 4/2004 | Reddy et al. | |
| 6,729,405 B2 | 5/2004 | DiLullo et al. | |
| 6,737,385 B2 | 5/2004 | Todd et al. | |
| 6,743,288 B2 | 6/2004 | Eoff et al. | |
| 6,752,866 B2 | 6/2004 | Gonnon et al. | |
| 6,767,868 B2 | 7/2004 | Dawson et al. | |
| 6,786,966 B1 | 9/2004 | Johnson et al. | |
| 6,793,018 B2 | 9/2004 | Dawson et al. | |
| 6,793,730 B2 | 9/2004 | Reddy et al. | |
| 6,796,378 B2 | 9/2004 | Reddy et al. | |
| 6,822,061 B2 | 11/2004 | Eoff et al. | |
| 6,823,940 B2 | 11/2004 | Reddy et al. | |
| 6,832,651 B2 | 12/2004 | Ravi et al. | |
| 6,832,652 B1 | 12/2004 | Dillenbeck et al. | |
| 6,837,316 B2 | 1/2005 | Reddy et al. | |
| 6,840,319 B1 | 1/2005 | Chatterji et al. | |
| 6,840,996 B2 | 1/2005 | Morioka et al. | |
| 6,843,841 B2 | 1/2005 | Reddy et al. | |
| 6,843,977 B2 * | 1/2005 | Pinnavaia et al. | 423/702 |
| 6,881,708 B2 | 4/2005 | Reddy et al. | |
| 6,883,609 B2 | 4/2005 | Drochon et al. | |
| 6,887,828 B2 | 5/2005 | Allen et al. | |
| 6,889,767 B2 | 5/2005 | Reddy et al. | |
| 6,907,929 B2 | 6/2005 | Leroy-Delage et al. | |
| 6,953,091 B2 | 10/2005 | Volpert | |
| 6,959,773 B2 | 11/2005 | Mese et al. | |
| 6,960,624 B2 | 11/2005 | Gonnon et al. | |
| 6,964,302 B2 | 11/2005 | Luke et al. | |

| | | |
|---|---|---|
| 6,989,057 B2 | 1/2006 | Getzlaf et al. |
| 7,021,380 B2 | 4/2006 | Caveny et al. |
| 7,048,053 B2 | 5/2006 | Santra et al. |
| 7,073,585 B2 | 7/2006 | Morgan et al. |
| 7,137,448 B2 | 11/2006 | Arias et al. ............. 466/292 |
| 7,140,439 B2 | 11/2006 | Luke et al. |
| 7,140,440 B2 | 11/2006 | Luke et al. |
| 7,147,067 B2 | 12/2006 | Getzlaf et al. |
| 7,150,321 B2 | 12/2006 | Luke et al. |
| 7,182,137 B2 | 2/2007 | Fyten et al. |
| 7,228,905 B2 | 6/2007 | Santra et al. |
| 7,285,164 B2 | 10/2007 | Luke et al. |
| 7,285,166 B2 | 10/2007 | Luke et al. |
| 7,296,626 B2 | 11/2007 | Luke et al. |
| 7,297,664 B2 | 11/2007 | Santra et al. |
| 7,303,015 B2 | 12/2007 | Fyten et al. |
| 7,309,558 B1 * | 12/2007 | Michel et al. ............ 430/137.1 |
| 7,316,744 B2 | 1/2008 | De La Roij |
| 7,326,291 B2 | 2/2008 | Fyten et al. |
| 7,332,026 B2 | 2/2008 | Fyten et al. |
| 7,338,925 B2 | 3/2008 | Santra et al. |
| 2001/0014651 A1 | 8/2001 | Reddy et al. |
| 2002/0077390 A1 | 6/2002 | Gonnon et al. |
| 2002/0091177 A1 | 7/2002 | Gonnon et al. |
| 2002/0117090 A1 | 8/2002 | Ku |
| 2002/0157575 A1 | 10/2002 | DiLullo et al. |
| 2003/0033677 A1* | 2/2003 | Nguyen et al. ............. 8/405 |
| 2003/0066460 A1 | 4/2003 | Reddy et al. |
| 2003/0092582 A1 | 5/2003 | Reddy et al. |
| 2003/0096945 A1 | 5/2003 | Eoff et al. |
| 2003/0147830 A1* | 8/2003 | Phillips et al. ........... 424/70.14 |
| 2003/0153466 A1 | 8/2003 | Allen et al. |
| 2003/0168215 A1 | 9/2003 | Drochon et al. |
| 2003/0181543 A1 | 9/2003 | Reddy et al. |
| 2003/0203996 A1 | 10/2003 | Gonnon et al. |
| 2003/0217847 A1 | 11/2003 | Reddy et al. |
| 2004/0007162 A1 | 1/2004 | Morioka et al. |
| 2004/0007360 A1 | 1/2004 | Leroy-Delage et al. |
| 2004/0035331 A1 | 2/2004 | Volpert |
| 2004/0040475 A1 | 3/2004 | Roij |
| 2004/0040712 A1 | 3/2004 | Ravi et al. |
| 2004/0069537 A1 | 4/2004 | Reddy et al. |
| 2004/0069538 A1 | 4/2004 | Reddy et al. |
| 2004/0083926 A1 | 5/2004 | Mitkova et al. |
| 2004/0094331 A1 | 5/2004 | Mese et al. |
| 2004/0107877 A1 | 6/2004 | Getzlaf et al. |
| 2004/0108113 A1 | 6/2004 | Luke et al. |
| 2004/0112255 A1 | 6/2004 | Bruno et al. |
| 2004/0112600 A1 | 6/2004 | Luke et al. |
| 2004/0168803 A1 | 9/2004 | Reddy et al. |
| 2004/0187740 A1 | 9/2004 | Timmons |
| 2004/0188091 A1 | 9/2004 | Luke et al. |
| 2004/0188092 A1 | 9/2004 | Santra et al. |
| 2004/0244977 A1 | 12/2004 | Luke et al. |
| 2004/0262000 A1 | 12/2004 | Morgan et al. |
| 2004/0262001 A1 | 12/2004 | Caveny et al. |
| 2005/0000734 A1 | 1/2005 | Getzlaf et al. |
| 2005/0034864 A1 | 2/2005 | Caveny et al. |
| 2005/0072599 A1 | 4/2005 | Luke et al. |
| 2005/0121194 A1 | 6/2005 | Morgan et al. |
| 2005/0124503 A1 | 6/2005 | Morgan et al. |
| 2005/0133222 A1 | 6/2005 | Arias et al. |
| 2005/0204962 A1 | 9/2005 | Luke et al. |
| 2006/0025312 A1 | 2/2006 | Santra et al. |
| 2006/0108150 A1 | 5/2006 | Luke et al. |
| 2006/0137876 A1 | 6/2006 | Santra et al. |
| 2006/0148657 A1 | 7/2006 | Santra et al. |
| 2007/0028811 A1 | 2/2007 | Luke et al. |
| 2007/0032388 A1 | 2/2007 | Getzlaf et al. |
| 2007/0051279 A1 | 3/2007 | Fyten et al. |
| 2007/0051280 A1 | 3/2007 | Fyten et al. |
| 2007/0051515 A1 | 3/2007 | Fyten et al. |
| 2007/0101906 A1 | 5/2007 | Luke et al. |
| 2008/0066652 A1 | 3/2008 | Fraser et al. |

FOREIGN PATENT DOCUMENTS

| | | |
|---|---|---|
| EP | 0 802 253 A1 | 10/1997 |
| EP | 0 895 971 A1 | 2/1999 |
| EP | 0 621 247 B1 | 7/1999 |
| EP | 1 260 491 A1 | 11/2002 |
| EP | 1 428 808 A1 | 6/2004 |
| FR | 763.998 | 11/1933 |
| GB | 2353523 | 2/2001 |
| JP | J52117316 | 10/1977 |
| JP | 61021947 | 1/1986 |
| JP | J 7003254 | 1/1995 |
| JP | J10110487 | 4/1998 |
| RU | SU1373781 | 2/1988 |
| WO | WO 97/28097 | 8/1997 |
| WO | WO 98/54108 | 12/1998 |
| WO | WO 00/50357 | 8/2000 |
| WO | WO 01/70646 A1 | 9/2001 |
| WO | WO 2005/059301 A1 | 6/2005 |

OTHER PUBLICATIONS

Baroid brochure entitled "Aquagel Gold Seal®" dated 2002.
Baroid Fluid Services brochure entitled "Barazan® Viscosifier/Suspension Agent" dated 2005.
Halliburton brochure entitled "CFR-2 Cement Friction Reducer" dated 1999.
Halliburton brochure entitled "CFR-3 Cement Friction Reducer" dated 1998.
Halliburton brochure entitled "D-Air 2 Anti-Foam Agent" dated 1999.
Baroid Fluid Services brochure entitled "Duratone® HT Filtration Control Agent" dated 2005.
Baroid Fluid Services brochure entitled "EZ-MUD® Shale Stabilizer" dated 2005.
Baroid Fluid Services brochure entitled "EZ MUL® Emulsifier" dated 2005.
Baroid Fluid Services brochure entitled "EZ MUL® NTE Emulsifier" dated 2005.
Baroid Fluid Services brochure entitled "Geltone® II Viscosifier" dated 2005.
Baroid Fluid Services brochure entitled "Geltone® V Viscosifier" dated 2005.
Halliburton brochure entitled "Halad®-344 Fluid-Loss Additive" dated 1998.
Halliburton brochure entitled "Halad®-413 Fluid-Loss Additive" dated 1999.
Halliburton brochure entitled "HR®-5 Cement Additive" dated 1998.
Halliburton brochure entitled "HR®-7 Cement Retarder" dated 1999.
Baroid Fluid Services brochure entitled "Invermul® Emulsifier" dated 2005.
Halliburton brochure entitled "Microsand Cement Additive" dated 1999.
Halliburton brochure entitled "SSA-1Strength-Stabilizing Agent" dated 1998.
Halliburton brochure entitled "SSA-2 Coarse Silica Flour" dated 1999.
Sersale, R. et al., "Portland-Zeolite-Cement For Minimizing Alkali-Aggregate Expansion" Cement and Concrete Research, vol. 17, pp. 404-410.
"Hydraulic engineering cement", International Center for Materials Technology Promotion, 2003.
"Portland Cement, Concrete, and Heat of Hydration", Portland Cement Association, Concrete Technology Today, vol. 18, No. 2, 1997.
Atkins, M. et al., "Zeolite P In Cements: Its Potential For Immobilizing Toxic and Radioactive Waste Species," pp. 127-135.
Powder Diffraction File, International Centre for Diffraction Data, 2002.
Underdown, D.R. et al., "Acidization of Analcime-Cemented Sandstone, Gulf of Mexico", SPE 20624, dated 1990.

Rogers, B.A. et al., "Designing a Remedial Acid Treatment for Gulf of Mexico Deepwater Turbidite Sands Containing Zeolite Cement," SPE 39595, dated 1998.

Bruhn, R.L. et al., "Tectonics, fluid migration, and fluid pressure in a deformed forearc basin, Cook Inlet, Alaska," dated 2000.

Brown, K.M., Hydraulic Conductivity Measurements on Discrete Samples Collected From Leg 141, Site 863, pp. 401-405.

Komarneni, S. et al., "Alteration of Clay Minerals and Zeolites in Hydrothermaly Brines" dated 1983.

Bartlet-Gouedard, V. et al., "A Non-Conventional Way of Developing Cement Slurry for Geothermal Wells," pp. 85-91.

Marfil, S.A. et al., "Zeolite Crystallization in Portland Cement Concrete," pp. 1283-1288.

Poon, C.S. et al., "A study on the hydratino rate of natural zeolite blended cement pastes" dated 1999.

Feng, N-Q et al., "Zeolite ceramsite cellular concrete" pp. 117-112, dated 2000.

Bagosi, S. et al., "Immobilization of caesium-loaded ion exchange resins in zeolite-cement blends" pp. 479-485,d ated 1999.

"Effect of Bentonite and Zeolite on Durability of Cement Suspension under Sulfate Attack," ACI Materials Journal, pp. 710-715, dated 1998.

Su, N. et al., "Reuse of waste catalysts from petrochemical industries for cement substitution," pp. 1773-1783, dated 2000.

Ding, Jian-Tong et al., "Extreme vertices design of concrete with combined mineral admixtures," dated 1999.

Naiqian, F. et al., "Study on the suppression effect of natural zeolite on expansion of concrete due to alkali-aggregate reaction," pp. 17-24, dated 1998.

Chan, S. et al., "Comparative study of the initial surface absorption and chloride diffusion of high performance zeolite, silica fume and PFA concretes," pp. 293-300.

Poon, C.S. et al., "A study on the hydration rate of natural zeolite blended cement pastes," pp. 427-432, dated 1999.

Janotka, I., "The properties of Mortar Using Blends With Portland Cement Clinker, Zeolite Tuff and Gypsum", dated 1992.

Office action from a related counterpart U.S. Appl. No. 10/315,415 dated Dec. 4, 2003.

Office action from a related counterpart U.S. Appl. No. 10/315,415 dated Jun. 25, 2004.

Office action from a related counterpart U.S. Appl. No. 10/315,415 dated Sep. 10, 2004.

Office action from a related counterpart U.S. Appl. No. 10/315,415 dated Nov. 9, 2004.

Office action from a related counterpart U.S. Appl. No. 10/623,443 dated Sep. 7, 2005.

Office action from a related counterpart U.S. Appl. No. 10/727,370 dated Nov. 4, 2005.

Office action from a related counterpart U.S. Appl. No. 10/738,199 dated Nov. 7, 2005.

Office action from a related counterpart U.S. Appl. No. 10/795,158 dated Dec. 6, 2005.

Office action from a related counterpart U.S. Appl. No. 11/126,626 dated Dec. 7, 2005.

Office action from a related counterpart U.S. Appl. No. 10/816,034 dated Dec. 27, 2005.

Foreign communication from a related counterpart application dated Mar. 25, 2004.

Foreign communication from a related counterpart application dated Aug. 23, 2004.

Foreign communication from a related counterpart application dated Jul. 28, 2005.

Foreign communication from a related counterpart application dated Nov. 4, 2005, Foreign communication from a related counterpart application dated Nov. 25, 2004.

Office action from a related counterpart U.S. Appl. No. 10/623,43 dated Mar. 3, 2006.

Office action from a related counterpart U.S. Appl. No. 11/126,626 datd Jun. 23, 2006.

Office action from a related counterpart U.S. Appl. No. 10/315,415 dated May 12, 2005.

Office action from a related counterpart U.S. Appl. No. 10/686,098 dated Nov. 18, 2004.

Office action from U.S. Appl. No. 11/338,485 dated Aug. 11, 2006.

Luke, Karen et al., "Zeolite-Containing Drilling Fluids," filed Oct. 9, 2006 as U.S. Appl. No. 11/544,691.

Luke, Karen et al., "Fluid Loss Additives For Cement Slurries," filed Oct. 10, 2006 as U.S. Appl. No. 11/545,392.

Office action dated Nov. 24, 2006 from U.S. Appl. No. 11/126,626.

Fyten, Glen et al., "Cementitious Compositions Containing Interground Cement Clinker and Zeolite" filed Nov. 8, 2006 as U.S. Appl. No. 11/594,435.

Fyten, Glen et al., "Cementitious Compositions Containing Interground Cement Clinker and Zeolite" filed Nov. 8, 2006 as U.S. Appl. No. 11/594,326.

Fyten, Glen et al., "Cementitious Compositions Containing Interground Cement Clinker and Zeolite" filed Nov. 8, 2006 as U.S. Appl. No. 11/594,430.

Fyten, Glen et al., "Cementitious Compositions Containing Interground Cement Clinker and Zeolite" filed Nov. 8, 2006 as U.S. Appl. No. 11/594,435.

Fyten, Glen et al., "Cementitious Compositions Containing Interground Cement Clinker and Zeolite" filed Nov. 8, 2006 as U.S. Appl. No. 11/594,326.

Fyten, Glen et al., "Cementitious Compositions Containing Interground Cement Clinker and Zeolite" filed Nov. 8, 2006 as U.S. Appl. No. 11/594,430.

Office Action dated Jul. 27, 2006, issued in connection with U.S. Appl. No. 10/623,443.

Office Action dated May 25, 2007, issued in connection with U.S. Appl. No. 10/623,443.

Office Action dated Jul. 22, 2007, issued in connection with U.S. Appl. No. 11/338,576.

Office Action dated Jun. 21, 2007, issued in connection with U.S. Appl. No. 11/338,576.

Halliburton/Baroid brochure entitled EZ MUL Emulsifier, 2002.

Halliburton/Baroid brochure entitled EZ MUL NTE Emulsifier, 2002.

Halliburton/Baroid brochure entitled Geltone II Viscosifier, 2002.

Halliburton/Baroid brochure entitled Geltone V Viscosifier, 2002.

Halliburton/Baroid brochure entitled Duratone HT, Filtration Control Agent, 2002

Halliburton/Baroid brochure entitled Barazan Plus, 2002.

Halliburton/Baroid brochure entitled EZ-MUD Shale Stabilizer, 2002.

Halliburton/Baroid brochure entitled Invermul Emulsifier, 2002.

Office Action issued Oct. 9, 2007, by the United States Patent and Trademark Office in connection with U.S. Appl. No. 10/623,443.

Office Action issued Nov. 7, 2007, by the United States Patent and Trademark Office in connection with U.S. Appl. No. 11/270,307.

Office Action issued Oct. 30, 2007, by the United States Patent and Trademark Office in connection with U.S. Appl. No. 11/544,691.

Notice of Allowance issued Dec. 14, 2007, by the U.S. Patent and Trademark Office in connection with U.S. Appl. No. 11/338,576.

Office Action issued Apr. 10, 2008, by the U.S. Patent and Trademark Office in connection with U.S. Appl. No. 10/623,443.

Office Action mailed may 27, 2008, by the U.S. Patent and Trademark Office in connection with U.S. Appl. No. 11/544,691.

Advisory Action mailed Jun. 17, 2008, by the U.S. Patent and Trademark Office in connection with U.S. Appl. No. 10/623,443.

Advisory Action mailed Aug. 11, 2008, by the U.S. Patent and Trademark Office in connection with U.S. Appl. No. 11/544,691.

Office Action mailed Aug. 21, 2008, by the U.S. Patent and Trademark Office in connection with U.S. Appl. No. 10/623,443.

Office Action mailed Nov. 13, 2008, by the U.S. Patent and Trademark Office in connection with U.S. Appl. No. 11/544,691.

* cited by examiner

ZEOLITE-CONTAINING REMEDIAL COMPOSITIONS

CROSS-REFERENCE TO RELATED APPLICATIONS

This application is a divisional of prior application Ser. No. 10/727,370 filed Dec. 4, 2003 now U.S. Pat. No. 7,140,439, the entire disclosure of which is incorporated herein by reference, which itself is a continuation-in-part of prior application Ser. No. 10/686,098 filed Oct. 15, 2003 now U.S. Pat. No. 6,964,302, the entire disclosure of which is incorporated herein by reference, which itself is a continuation-in-part of prior application Ser. No. 10/623,443 filed Jul. 18, 2003, the entire disclosure of which is incorporated herein by reference, and which itself is a continuation-in-part of prior application Ser. No. 10/315,415, filed Dec. 10, 2002 now U.S. Pat. No. 6,989,057, the entire disclosure of which is incorporated herein by reference.

BACKGROUND

The present embodiments relate generally to wellbore treating fluids introduced into a subterranean zone penetrated by a wellbore, particularly fluids introduced as remedial compositions such as pills.

Conventionally, a wellbore is drilled using a drilling fluid that is continuously circulated down a drill pipe, through a drill bit, and upwardly through the wellbore to the surface. Typically, after a wellbore has been drilled to total depth, the drill bit is withdrawn from the wellbore, and circulation of the drilling fluid is stopped, thereby initiating a shut-down period. The drilling fluid is left in the wellbore to provide hydrostatic pressure (i.e., hole stability) on permeable formations penetrated by the well bore, thereby preventing the flow of formation fluids into the wellbore. Another function provided by the drilling fluid left in the wellbore is to prevent lost circulation, by sealing off the walls of the wellbore so that the drilling fluid is not lost into highly permeable subterranean zones penetrated by the wellbore. Sealing off the walls of the wellbore is typically accomplished during the shut down period by the deposit of a filter cake of solids from the drilling fluid, and additional dehydrated drilling fluid and gelled drilling fluid, on the walls of the wellbore.

The next operation in completing the wellbore usually involves running a pipe string, e.g., casing, into the wellbore. After the pipe is run in the wellbore, the next operation typically involves cleaning out the wellbore, which may be accomplished by re-initiating circulation of drilling fluid. After clean-up operations are performed in the wellbore, primary cementing operations are typically performed therein. Namely, the pipe is cemented in the wellbore by placing a cement slurry in the annulus between the pipe and the walls of the wellbore.

During any of the above or other operations performed in the wellbore, a number of problems can occur that require remedial operations. One such problem is lost circulation. Lost circulation occurs when the drilling fluid is "lost" into the subterranean zone penetrated by the wellbore. The drilling fluid can be lost when the drill bit encounters spaces such as fissures, fractures, or caverns in the subterranean zone, and the drilling fluid flows into such spaces. Lost circulation can also occur when the hydrostatic pressure provided by the drilling fluid in the wellbore is compromised. This occurs when the drill bit encounters other types of "spaces", such as unfavorable subterranean zones, which may be comparatively low pressure subterranean zones, such as vugs, fractures, and other thief zones, and similarly, comparatively high pressure subterranean zones. When lost circulation occurs, remedial steps are required.

Most remedial steps for lost circulation comprise introducing a remedial composition into the wellbore to seal the above-described spaces. Examples of such remedial compositions comprise mixtures of clay and aqueous rubber latex or hydratable polymer (e.g., U.S. Pat. Nos. 5,913,364; 6,060,434; 6,167,967; 6,258,757), which form masses with a consistency often referred to as "rubbery", "viscous", or "gelatinous", to seal the space. Exemplary remedial compositions form such masses upon contact with drilling fluid, mud or other compositions with which the remedial composition is designed to react, thereby sealing fractures, fissures, low pressure or high pressure subterranean zones, and the like. Such remedial compositions are often referred to as a "pill" by those of ordinary skill in the art.

The present embodiments provide compositions in the form of remedial compositions, such as pills, that comprise zeolite, as well as methods for the use of such remedial compositions comprising zeolite.

DESCRIPTION

According to embodiments described herein, wellbore treating fluids comprising zeolite are introduced into a wellbore in the form of a remedial composition such as a pill. In one embodiment, the wellbore treating fluid comprises a pill comprising zeolite.

Methods according to the present embodiments provide for introducing a wellbore treating fluid comprising zeolite into a subterranean zone penetrated by a wellbore to remediate lost circulation, and to seal fissures, fractures, caverns, vugs, thief zones, low pressure or high pressure subterranean zones.

Remedial compositions that generally form a mass upon contact with a drilling fluid, mud or other composition with which the remedial composition is designed to react are referred to herein as a "pill". As used herein, the term "mud" encompasses any fluid used in hydrocarbon drilling operations, including but not limited to all types of water-base, oil-base and synthetic-base drilling fluids, and fluids that contain significant amounts of suspended solids, emulsified water or oil.

According to the present embodiments, a pill comprising zeolite and at least one carrier fluid is provided. Pills according to the present embodiments can be used with any methods in which conventional remedial compositions are used. For example, a pill according to the present embodiments can be used as a remedial composition for lost circulation. The carrier fluid can be one or more oil-based or water-based fluids as illustrated further herein. The zeolite and carrier fluid (whether water-based or oil-based) are referred to herein as "base components" of the pill to provide a point of reference for additional components such as activators and surfactants. According to one embodiment, the zeolite is present in an amount of from about 5 to about 75 weight percent of the total weight of the base components. According to other embodiments, zeolite is present in an amount of from about 20 to about 60 weight percent of the total weight of the base components. According to still other embodiments, zeolite is present in an amount of from about 30 to about 50 weight percent of the total weight of the base components.

Whether the at least one carrier fluid is water-based or oil-based, embodiments of the pill herein comprise carrier fluid in an amount from about 25 to about 95 weight percent of the total weight of the base components. According to other embodiments, carrier fluid is present in an amount of from about 40 to about 80 weight percent of the total weight of the base components. According to still other embodiments, carrier fluid is present in an amount of from about 50 to about 70 weight percent of the total weight of the base components.

When the drilling fluid, mud, or other composition with which the pill comprising zeolite is desired to react is water-based, then the pill comprises zeolite and at least one oil-based carrier fluid. Alternatively, the carrier fluid is a synthetic-based fluid. When such oil-based (or synthetic-based) pill is introduced into the wellbore, it will react when it comes into contact with the water-based fluid, thereby forming a mass.

According to another embodiment, when the drilling fluid, mud or other composition with which the pill comprising zeolite is desired to react is oil-based or synthetic-based, then the pill comprises zeolite and at least one water-based carrier fluid. Thus, when such water-based pill is introduced into the wellbore, it will react when it comes into contact with the oil-based or synthetic-based drilling fluid, thereby forming a mass.

According to yet another embodiment, when the pill comprising zeolite is oil-based or synthetic-based, or when the drilling fluid, mud or composition with which the pill is desired to react is oil-based or synthetic-based, the pill further comprises at least one surfactant. Surfactants are known to those of ordinary skill in the art, and the selection of a type and concentration of a surfactant largely depends on the nature and composition of the pill, which can be determined by those of ordinary skill in the art. Suitable surfactants for use with the present embodiments include but are not limited to cetyltrimethylammonium chloride, cocoaalkyltrimethylammonium chloride, cocoalkyldimethylbenzyl ammonium chloride, stearyltrimethylammonium chloride, alkylbehenyltrimethylammonium chloride dihydrogenatedtallowalkylethylmethyleammonium ethosulfate, didecyldimethylammonium chloride, dicocyldimethylammonium chloride, distearyldimethylammonium chloride, dioleyldimethylammonium chloride, trilaurylmethylammonium chloride, cocoyl-bis-(2-hydroxyethyl)methylammonium chloride, polyoxyethylene (15) cocoalkylmethylammonium chloride, olyel-bis-(2-hydroxyethyl) methylammonium chloride, tallowalkylmethylpropylenediammonium dichloride, and trimethyltallowammonium chloride. According to one embodiment illustrated herein, a remedial composition comprising zeolite and at least one carrier fluid further comprises trimethyltallowammonium chloride as a surfactant.

According to still other embodiments, an activator is incorporated into the pills of the present embodiments in an amount of from about 1 to about 20 weight percent based on the total weight of the base components of the pill. The activator can be any of calcium hydroxide, sodium silicate, sodium fluoride, sodium silicofluoride, magnesium silicofluoride, zinc silicofluoride, sodium carbonate, potassium carbonate, sodium hydroxide, potassium hydroxide, sodium sulfate, and mixtures thereof. Selection of type and concentration of an activator(s) largely depends on the nature and composition of the pill. Typically, the activator is selected so that it will add strength to the mass formed when the pill is contacted with a drilling fluid, mud, or other composition with which it is designed to react. According to one embodiment, the activator is calcium hydroxide (commonly referred to as lime).

As described above, conventional pills comprise materials that form a mass upon contact with the drilling fluid, mud or other composition with which the pill is designed to react, thereby sealing spaces such as fissures, fractures, caverns, vugs, thief zones, low pressure or high pressure subterranean zones and preventing lost circulation. Pills comprising zeolite according to embodiments presented herein develop compressive strength over time, which results in an enhanced sealing of such spaces. Moreover, the sealing of such spaces according to the present embodiments strengthens the wellbore formation such that higher density muds, drilling fluids, and other wellbore treating fluids can be pumped through the wellbore without compromising the stability of the wellbore.

Zeolites are porous alumino-silicate minerals that may be either a natural or manmade material. Manmade zeolites are based on the same type of structural cell as natural zeolites, and are composed of aluminosilicate hydrates having the same basic formula as given below. It is understood that as used in this application, the term "zeolite" means and encompasses all natural and manmade forms of zeolites. All zeolites are composed of a three-dimensional framework of $SiO_4$ and $AlO_4$ in a tetrahedron, which creates a very high surface area. Cations and water molecules are entrained into the framework. Thus, all zeolites may be represented by the crystallographic unit cell formula:

$$M_{a/n}[(AlO_2)_a(SiO_2)_b] \cdot xH_2O$$

where M represents one or more cations such as Na, K, Mg, Ca, Sr, Li or Ba for natural zeolites and $NH_4$, $CH_3NH_3$, $(CH_3)_3NH$, $(CH_3)_4N$, Ga, Ge and P for manmade zeolites; n represents the cation valence; the ratio of b:a is in a range from greater than or equal to 1 and less than or equal to 5; and x represents the moles of water entrained into the zeolite framework.

Preferred zeolites for use in the wellbore treating fluids of the present embodiments include analcime (hydrated sodium aluminum silicate), bikitaite (lithium aluminum silicate), brewsterite (hydrated strontium barium calcium aluminum silicate), chabazite (hydrated calcium aluminum silicate), clinoptilolite (hydrated sodium aluminum silicate), faujasite (hydrated sodium potassium calcium magnesium aluminum silicate), harmotome (hydrated barium aluminum silicate), heulandite (hydrated sodium calcium aluminum silicate), laumontite (hydrated calcium aluminum silicate), mesolite (hydrated sodium calcium aluminum silicate), natrolite (hydrated sodium aluminum silicate), paulingite (hydrated potassium sodium calcium barium aluminum silicate), phillipsite (hydrated potassium sodium calcium aluminum silicate), scolecite (hydrated calcium aluminum silicate), stellerite (hydrated calcium aluminum silicate), stilbite (hydrated sodium calcium aluminum silicate) and thomsonite (hydrated sodium calcium aluminum silicate). Most preferably, the zeolites for use in the wellbore treating fluids of the present embodiment include chabazite and clinoptilolite.

Carrier fluids suitable for use in the embodiments of wellbore treating fluids disclosed herein comprise an aqueous fluid, such as water and water-based gels, oil-based and synthetic-based fluids, emulsions, acids, or mixtures thereof. Exemplary oil-based fluids include but are not limited to canola oil, kerosene, diesel oil, fish oil, mineral oil, sunflower oil, corn oil, soy oil, olive oil, cottonseed oil, peanut oil and paraffin. Exemplary synthetic-based fluids include but are not limited to esters, olefins and ethers.

The preferred carrier fluid depends upon the properties desired for the wellbore treating fluid, as well as the cost, availability, temperature, stability, viscosity, clarity, and the like, of the carrier fluid. When the carrier fluid comprises water, the water can be fresh water, unsaturated salt solution, including brines and seawater, and saturated salt solution.

In carrying out the methods of the present embodiments, drilling operations include drilling a wellbore with a mud, introducing a wellbore treating fluid comprising zeolite and at least one carrier fluid into the wellbore, and forming a mass in the wellbore by allowing the wellbore treating fluid to come into contact with the mud.

Other methods according to the present embodiments include methods for performing remedial operations in a wellbore by introducing a wellbore treating fluid comprising zeolite and a carrier fluid into the wellbore, allowing the wellbore treating fluid to come into contact with a mud residing in at least one space in the wellbore such as a fissure, fracture, cavern, vug, thief zone, low pressure or high pressure subterranean zone, whereby the wellbore treating fluid forms a mass and seals the space.

The following examples are illustrative of the foregoing methods and compositions.

EXAMPLE 1

Three water-based muds, (Muds 1, 2, and 3), one oil-based mud, (Mud 4) and one synthetic-based mud (Mud 5), were obtained from Baroid Industrial Drilling Products. Muds 1-5 were obtained from Baroid already prepared, however the components of each mud, and the amount of each, are identified in Table 1A.

The precise chemical identification of the ester in Mud 5 obtained from Baroid is not known. However, the ester can generally be described as a monocarboxylic acid ester of a $C_2$-$C_{12}$ monofunctional alkanol, wherein the monocarboxylic acid contains from 12 to 16 carbon atoms and is aliphatically saturated. Such esters are described in U.S. Pat. No. 5,252,554, issued Oct. 12, 1993 to Mueller et al. and assigned to Baroid Limited.

In addition, the precise chemical description of the following components identified in Table 1A is not known, however the function of each component is provided as follows: BARAZAN PLUS is a suspension agent/viscosifier that includes xanthan gum; EZ-MUD is a shale stabilizing polymer solution; INVERMUL, EZ-MUL, and EZ-MUL NTE are emulsifiers; GELTONE II and GELTONE V are viscosifiers; and DURATONE HT is a filtration control agent. The amount of each component is reported in Table 1A in "lb/bbl", which indicates pounds of component per barrel of mud.

Two oil-based pills comprising zeolite (Pills 1 and 2) were prepared by pouring the amount of canola oil and kerosene indicated in Table 1B into a measuring cylinder, sealing it and then shaking it back and forth by hand to form an oil mixture. The oil mixture was then poured into a Waring blender and Arquad T-50™ surfactant was added in the amount reported in the table. Arquad T-50™ is a trimethyltallowammonium chloride (50% active) surfactant that is commercially available from Armak Industrial Chemicals Division. The zeolite, and lime where indicated, were added to the blender over a period of 30 seconds at a blender speed of 2000 rpm. Mixing was then continued until a homogenous mix was obtained, which took approximately 1 minute.

Two water-based pills comprising zeolite (Pills 3 and 4) were prepared by adding the zeolite, and lime where indicated, to water in a Waring blender over a period of 30 seconds at 2000 rpm. Mixing was then continued until a homogenous mix was obtained, which took approximately 1 minute.

The amounts of zeolite, canola oil, kerosene and water (as applicable) used to prepare Pills 1-4 are reported in the table as a weight percent ("wt. %"), while the amounts of lime and surfactant (as applicable) are reported as a weight percent of the total weight of the "base components" ("wt. % base"). The zeolite, canola oil, kerosene and water are referred to in the table as "base components" merely to provide a point of reference for the amount of lime and surfactant used to prepare Pills 1-4. Similarly, the lime and surfactant are referred to in the table as "additives" merely to illustrate that the amount of these components is calculated based on the total weight of the zeolite, canola oil, kerosene and water. The zeolite used to prepared Pills 1-4 was chabazite, which is commercially available from C2C Zeolite Corporation of Calgary, Canada.

TABLE 1A

| Components (lb/bbl) | Mud 1 Water Based | Mud 2 Water Based | Mud 3 Water Based | Mud 4 Oil Based | Mud 5 Synthetic Based |
|---|---|---|---|---|---|
| Bentonite | 15 | 22 | 15 | 0 | 0 |
| Caustic soda | 0.75 | 0.75 | 0.75 | 0 | 0 |
| BARAZAN PLUS | 0.5 | 0 | 0.5 | 0 | 0 |
| Lime | 0 | 1.0 | 0 | 3.0 | 1.0 |
| EZ-MUD | 0 | 0 | 8.93 | 0 | 0 |
| Barite | 118 | 117 | 118 | 0 | 816 |
| Water | 36.5 | 37.7 | 36.5 | 0 | 0 |
| Diesel | 0 | 0 | 0 | 26.8 | 0 |
| Ester | 0 | 0 | 0 | 0 | 20.8 |
| 2% $CaCl_2$ Solution | 0 | 0 | 0 | 6.7 | 5.2 |
| INVERMUL | 0 | 0 | 0 | 7 | 0 |
| EZ-MUL | 0 | 0 | 0 | 1.5 | 0 |
| EZ-MUL NTE | 0 | 0 | 0 | 0 | 12 |
| GELTONE II | 0 | 0 | 0 | 1.5 | 0 |
| GELTONE V | 0 | 0 | 0 | 0 | 1.0 |
| DURATONE HT | 0 | 0 | 0 | 0 | 10 |

TABLE 1B

| | Pill 1 Oil Based | Pill 2 Oil Based | Pill 3 Water Based | Pill 4 Water Based |
|---|---|---|---|---|
| Base Components (wt. %) | | | | |
| Zeolite (Chabazite) | 46.0 | 37.6 | 48.0 | 37.6 |
| Canola Oil | 32.4 | 37.6 | 0 | 0 |
| Kerosene | 21.6 | 24.8 | 0 | 0 |
| Water | 0 | 0 | 52.0 | 62.4 |
| Additives (wt. % Base) | | | | |
| Hydrated Lime | 0 | 10.8 | 0 | 10.8 |
| Arquad T-50 | 0 | 0.48 | 0 | 0 |

Pills 1-4 were then blended by hand with Muds 1-5 to form ten sample compositions, as indicated in Table 1C. Prior to blending with a pill, each mud was stirred at low speed with a Series 2000, Model 50 variable speed laboratory dispersator mixer available from Premier Mill Corp. to give a uniform suspension. When the sample was prepared from an oil-based or synthetic-based mud, 100 mL of the indicated mud (i.e., Mud 4 or 5) was placed in a cylindrical plastic container and 100 mL of the indicated water based zeolite pill (i.e., Pill 3 or 4) was added. When the sample was prepared from a water-based mud, the same procedure was followed. Namely, 100 mL of the indicated mud (i.e., Mud 1, 2, or 3) was placed in a cylindrical plastic container and 100 mL of the indicated oil based zeolite pill (i.e., Pill 1 or 2) was added. For each of the ten samples, the plastic container was sealed with a cap, and then hand shaken for from about 30 seconds to about 1 minute, by which time the sample had turned into a mass, as reported in Table 1C. The consistency of each mass was similar to the consistency of the masses formed by conventional pills, which is often referred to as "rubbery", "viscous", or "gelatinous".

TABLE 1C

| Sample No. and Blend Composition | Result |
| --- | --- |
| Sample 1: Pill 1 + Mud 1 | mass |
| Sample 2: Pill 1 + Mud 2 | mass |
| Sample 3: Pill 1 + Mud 3 | mass |
| Sample 4: Pill 2 + Mud 1 | mass |
| Sample 5: Pill 2 + Mud 2 | mass |
| Sample 6: Pill 2 + Mud 3 | mass |
| Sample 7: Pill 3 + Mud 4 | mass |
| Sample 8: Pill 3 + Mud 5 | mass |
| Sample 9: Pill 4 + Mud 4 | mass |
| Sample 10: Pill 4 + Mud 5 | mass |

The results of Table 1C illustrate that remedial compositions comprising zeolite, such as Pills 1-4, are suitable for use in any methods in which a conventional remedial composition is used to form a mass. For example, the present embodiments can be used in drilling operations and remedial operations in wellbores where a mass is formed for purposes such as sealing fissures, fractures, caverns, vugs, thief zones, low pressure subterranean zones and high pressure subterranean zones. Further still, Table 1C illustrates that remedial compositions comprising zeolite, such as Pills 1-4, can be either water-based or oil-based, and can be used with conventional water-based or oil-based muds.

As reported in Table 1B, Pills 2 and 4 included hydrated lime. To determine whether the hydrated lime added strength to the mass, compressive strength measurements were taken for each sample that included either Pill 2 or Pill 4, namely, Samples 4-6 and 9-10. The compressive strengths of Samples 4-6 and 9-10 were determined by placing the sealed plastic containers used to gather the data reported in Table 1C in a water bath at 180° F. and atmospheric pressure for the time periods reported in Table 1D. The plastic containers were then removed from the water bath, allowed to cool and the cylindrical samples were demolded from each plastic container. The top end of each cylindrical sample was cut using a tile saw to give a smooth and level surface. The remainder of the sample was then placed in a Tineus Olsen universal testing machine and the compressive strength determined according to operating procedures for the universal testing machine. The compressive strength measurements are reported in Table 1D.

TABLE 1D

| Sample No. | Compressive strength (psi) Measured at 180° F. and at Time (Days) | | | |
| --- | --- | --- | --- | --- |
| | 5 days | 10 days | 15 days | 20 days |
| Sample 4 | 0 | 0 | 25 | 25 |
| Sample 5 | 0 | 0 | 25 | 25 |
| Sample 6 | 0 | 0 | 15 | 15 |
| Sample 9 | 27.1 | 26.8 | not taken | not taken |
| Sample 10 | 212 | 164 | not taken | not taken |

The compressive strength data indicates that wellbore treating fluids comprising zeolite and an activator, such as the remedial compositions of Pills 2 and 4, form masses that develop compressive strength. Such remedial compositions are suitable for use in methods of performing drilling operations and performing remedial operations. In the embodiments illustrated by Pills 2 and 4, the activator comprised lime (also known as "calcium hydroxide"). According to other embodiments, the activator is any of sodium silicate, sodium fluoride, sodium silicofluoride, magnesium silicofluoride, zinc silicofluoride, sodium carbonate, potassium carbonate, sodium hydroxide, potassium hydroxide, sodium sulfate, and mixtures thereof.

In practicing methods of the present embodiments, a remedial composition comprising zeolite, such as Pills 1-4, is introduced into a wellbore and allowed to come into contact with a mud residing in a space such as a fissure, fracture, cavern, vug, thief zone, low pressure subterranean zone or high pressure subterranean zone in the wellbore. When the remedial composition contacts the mud, a mass forms, thereby sealing the space and preventing problems such as lost circulation. Moreover, the sealing of such spaces strengthens the wellbore formation such that higher density muds, drilling fluids, and other wellbore treating fluids can be pumped through the wellbore without compromising the stability of the wellbore.

While the embodiments described herein relate to wellbore treating fluids provided as remedial compositions such as pills, it is understood that any wellbore treating fluids such as drilling, completion and stimulation fluids including, but not limited to, drilling muds, cement compositions, well cleanup fluids, workover fluids, spacer fluids, gravel pack fluids, acidizing fluids, fracturing fluids, conformance fluids, spotting fluids and the like can be prepared using zeolite and a carrier fluid. Accordingly, improved methods of the present invention comprise preparing a wellbore treating fluid using at least one carrier fluid and zeolite, as previously described herein, and placing the fluid in a subterranean formation. Other methods according to the present embodiments include performing drilling operations, completing and/or stimulating a subterranean formation, and performing primary cementing operations using a wellbore treating fluid comprising zeolite and at least one carrier fluid.

Other embodiments of the current invention will be apparent to those skilled in the art from a consideration of this specification or practice of the embodiments disclosed herein. However, the foregoing specification is considered merely exemplary of the present invention, with the true scope and spirit of the invention being indicated by the following claims.

The invention claimed is:

1. A wellbore treating composition for introduction into a subterranean zone comprising:
  a pill that forms a mass upon contact with a drilling fluid used in drilling a wellbore penetrating a subterranean zone, said pill comprising:
    a carrier fluid,
    a zeolite selected from the group consisting of analcime, bikitaite, brewsterite, chabazite, clinoptilolite, faujasite, harmotome, heulandite, laumontite, mesolite, natrolite, paulingite, phillipsite, scolecite, stellerite, stilbite, and thomsonite, and
    a surfactant selected from the group consisting of cetyltrimethylammonium chloride, cocoaalkyltrimethylammonium chloride, cocoalkyldimethylbenzyl ammonium chloride, stearyltrimethlyammonium chloride, alkylbehenyltrimethylammonium chloride dihydrogenatedtallowalkylethylmethyleammonium ethosulfate, didecyldimethylammonium chloride, dicocyldimethylammonium chloride, distearyldimethylammonium chloride, dioleyldimethylammonium chloride, trilaurylmethylammonium chloride, cocoyl-bis-(2-hydroxyethyl)methylammonium chloride, polyoxyethylene (15) cocoalkylmethylammonium chloride, olyel-bis-(2-hydroxyethyl) methylammonium chloride, tallowalkylmethyipropylenediammonium dichioride, and trimethyltallowammonium chloride.

2. The wellbore treating composition of claim 1, wherein the pill comprises zeolite in an amount of from about 5% to about 75% by weight based on the total weight of the zeolite and the carrier fluid.

3. The wellbore treating composition of claim 1, wherein the pill comprises zeolite in an amount of from about 20% to about 60% by weight based on the total weight of the zeolite and the carrier fluid.

4. The wellbore treating composition of claim 1, wherein the pill comprises zeolite in an amount of from about 30% to about 50% by weight based on the total weight of the zeolite and the carrier fluid.

5. The wellbore treating composition of claim 1, wherein the pill further comprises an activator.

6. The wellbore treating composition of claim 5, wherein the activator is present in the pill in an amount of from about 1% to about 20% by weight, based on the total weight of the zeolite and the carrier fluid.

7. The wellbore treating composition of claim 5, wherein the activator is selected from the group consisting of calcium hydroxide, sodium silicate, sodium fluoride, sodium silicofluoride, magnesium silicofluoride, zinc silicofluoride, sodium carbonate, potassium carbonate, sodium hydroxide, potassium hydroxide, sodium sulfate, and mixtures thereof.

8. The wellbore treating composition of claim 5, wherein the activator comprises calcium hydroxide in an amount of from about 1% to about 20% by weight based on the total weight of the zeolite and the carrier fluid.

9. The wellbore treating composition of claim 1, wherein the carrier fluid comprises an oil-based fluid.

10. The wellbore treating composition of claim 1, wherein the carrier fluid comprises one or more oil-based fluids selected from the group consisting of canola oil, kerosene, diesel oil, fish oil, mineral oil, sunflower oil, corn oil, soy oil, olive oil, cottonseed oil, peanut oil and paraffin.

11. The wellbore treating composition of claim 1, wherein the carrier fluid comprises a water-based fluid.

12. The wellbore treating composition of claim 1, wherein the carrier fluid is a water-based fluid selected from the group consisting of fresh water, unsaturated salt solution, brine, seawater, and saturated salt solution.

13. A system comprising:
a drilling fluid used in drilling a wellbore penetrating a subterranean zone, and
a pill comprising a carrier fluid, a zeolite and a surfactant, the zeolite being selected from the group consisting of analcime, bikitaite, brewsterite, chabazite, clinoptilolite, faulasite, harmotome, heulandite, laumontite, mesolite, natrolite, paulingite, phillipsite, scolecite, stellerite, stilbite, and thomsonite
wherein one of the drilling fluid and the carrier fluid is a water-based fluid, and the other of the drilling fluid and the carrier fluid is an oil-based fluid,
wherein the pill and the drilling fluid form a mass for sealing at least one space in the subterranean zone selected from the group consisting of fissures, fractures, caverns, vugs, thief zones, low pressure subterranean zones, and high pressure subterranean zones, and the surfactant being selected from the group consisting of cetyltrimethylammonium chloride, cocoalkyltrimethylammonium chloride, cocoalkyldimethylbenzyl ammonium chloride, stearyltrimethlyammonium chloride, alkylbehenyltrimethylammonium chloride, dehydrogenated-tallowalkylethylmethylammonium ethosulfate, didecyldimethylammonium chloride, dicocoyldimethylammonium chloride, distearyldimethylammonium chloride, dioleyldimethylammonium chloride, trilaurylrnethylammonium chloride, cocoyl-bis-(2-hydroxyethyl)methylammonium chloride, polyoxyethylene (15) cocoalkylmethylammonium chloride, olyel-bis-(2-hydroxyethyl) methylammonium chloride, tallowalkylmethylpropylenediammonium dichloride, and trimethyltallowammonium chloride.

14. The system of claim 13, wherein the pill comprises zeolite in an amount of from about 5% to about 75% by weight based on the total weight of the zeolite and the carrier fluid.

15. The system of claim 13, wherein the pill comprises zeolite in an amount of from about 20% to about 60% by weight based on the total weight of the zeolite and the carrier fluid.

16. The system of claim 13, wherein the pill comprises zeolite in an amount of from about 30% to about 50% by weight based on the total weight of the zeolite and the carrier fluid.

17. The system of claim 13, wherein the pill comprises an activator present in an amount of from about 1% to about 20% by weight, based on the total weight of the zeolite and the carrier fluid, the activator being selected from the group consisting of calcium hydroxide, sodium silicate, sodium fluoride, sodium silicofluoride, magnesium silicofluoride, zinc silicofluoride, sodium carbonate, potassium carbonate, sodium hydroxide, potassium hydroxide, sodium sulfate, and mixtures thereof.

18. The system of claim 13, wherein the carrier fluid comprises an oil-based fluid and the drilling fluid comprises a water-based fluid.

19. The system of claim 13, wherein the carrier fluid comprises an oil-based fluid selected from the group consisting of canola oil, kerosene, diesel oil, fish oil, mineral oil, sunflower oil, corn oil, soy oil, olive oil, cottonseed oil, peanut oil and paraffin.

20. The system of claim 13, wherein the carrier fluid comprises a water-based fluid selected from the group consisting of fresh water, unsaturated salt solution, brine, seawater, and saturated salt solution.

* * * * *